(12) United States Patent
Phillips et al.

(10) Patent No.: US 8,777,508 B2
(45) Date of Patent: Jul. 15, 2014

(54) CUTTING UNIT MOUNTING DEVICE

(75) Inventors: David Lawrence Phillips, Willow Spring, NC (US); Michael Joseph Buchheit, Apex, NC (US); Jennifer Lynn Jaramillo, Apex, NC (US); Paul Robert Heide, Cary, NC (US)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 13/167,265

(22) Filed: Jun. 23, 2011

(65) Prior Publication Data

US 2012/0328357 A1  Dec. 27, 2012

(51) Int. Cl.
*F16C 11/00* (2006.01)
*A01D 34/52* (2006.01)

(52) U.S. Cl.
USPC .............. 403/96; 403/4; 403/90; 403/104; 403/114; 56/294; 56/7

(58) Field of Classification Search
USPC ......... 403/76, 87, 90, 93, 103, 104, 114, 132, 403/136, 144, 92, 94, 3, 4, 96, 137, 149; 56/294
See application file for complete search history.

(56) References Cited

U.S. PATENT DOCUMENTS

| 3,958,904 A * | 5/1976 | Rusbach ...................... 403/90 |
| 4,227,826 A * | 10/1980 | Conrad ........................ 403/371 |
| 4,804,220 A * | 2/1989 | Rosheim ...................... 294/111 |
| 5,293,729 A | 3/1994 | Curry et al. |
| 5,297,378 A | 3/1994 | Smith |
| 5,343,680 A | 9/1994 | Reichen et al. |
| 5,409,332 A * | 4/1995 | Chabot et al. ................ 403/114 |
| RE34,921 E | 5/1995 | Lamusga et al. |
| 5,456,135 A * | 10/1995 | Li ................................ 74/551.7 |
| 5,459,984 A | 10/1995 | Reichen et al. |
| 5,803,642 A * | 9/1998 | Sassmannshausen ......... 403/90 |
| 6,322,279 B1 * | 11/2001 | Yamamoto et al. ............ 403/97 |
| 6,767,153 B1 * | 7/2004 | Holbrook ...................... 403/56 |
| 6,776,552 B2 * | 8/2004 | Marunaka .................... 403/124 |
| 7,287,363 B2 | 10/2007 | Phillips |
| 7,331,166 B2 | 2/2008 | Phillips |
| 7,334,956 B2 * | 2/2008 | Taylor .......................... 403/87 |
| 2007/0138358 A1 | 6/2007 | Chang |
| 2007/0212165 A1 * | 9/2007 | Rechtien et al. ............ 403/132 |
| 2008/0073477 A1 * | 3/2008 | Lang et al. .................... 248/476 |

FOREIGN PATENT DOCUMENTS

| DE | 1087989 B | 8/1960 |
| EP | 0933016 A1 | 8/1999 |
| EP | 1075787 A1 | 2/2001 |
| JP | 06280851 A * | 10/1994 ............. F16C 11/06 |

* cited by examiner

*Primary Examiner* — Daniel P Stodola
*Assistant Examiner* — Jonathan Masinick

(57) ABSTRACT

A cutting unit mounting device includes a ball through which a yoke extends laterally. The yoke is attached to the cutting unit, and the ball is pivotably mounted in a ball housing attached to a lift arm. A releasable lock pin engages and secures the ball within the ball housing in a mowing position or a service position. The ball housing has stops to limit the pivoting of the ball and yoke with respect to the ball housing. A releasable lock pin engages notches in the ball to engage and secure the ball in the mowing position or service position with respect to the ball housing.

12 Claims, 8 Drawing Sheets

CUTTING UNIT MOUNTING DEVICE

FIELD OF THE INVENTION

The present invention relates to grass mowing machines with one or more cutting units, and specifically to a cutting unit mounting device for a grass mowing machine that allows the cutting unit to pivot during mowing, to be raised to a transport position, and rotated to a service position.

BACKGROUND OF THE INVENTION

Grass mowing machines used for golf courses, parks, and athletic fields where a high quality of cut is desired, may include one or more cutting units. For example, each cutting unit may be a reel mower having multiple spiral cutting blades rotating in close proximity to a bedknife. Each cutting unit may be mounted to the grass mowing machine using a cutting unit mounting device or coupling mechanism through a yoke which may be a tubular element with a crossbar that extends laterally over and is attached to the left and right sides of the cutting unit. The cutting unit mounting device may include a pivoting mechanism to allow the cutting unit to pivot on multiple axes to cut grass on humps, slopes and other irregular surfaces without damaging the surfaces. The cutting unit mounting device should allow the cutting unit to pitch (front to back pivoting) and yaw (side-to-side pivoting). Additionally, the cutting unit mounting device should allow the cutting unit to pivot or steer on a vertical axis during a turn. This helps minimize the tendency of the cutting unit to drag, scuff or otherwise damage the turf during mowing. If several cutting units are carried by a vehicle, each cutting unit mounting device may be attached to the end of a lift arm that may pivot to allow the cutting unit to move up and down over the ground surface, while applying down pressure to the cutting unit.

The cutting unit mounting device also may allow the cutting unit to be raised from a mowing position to a transport position, and rotated to a service position. For example, U.S. Pat. No. 5,343,680 assigned to Deere & Company relates to a suspension mechanism for reel mowers allowing the operator to easily access the underside of cutting units for service, while remaining connected to the lift arms. A swing out feature is provided and includes a knuckle joint mechanism which allows the cutting units to swing downwardly when the lift arms are raised to a service position. The undersides of the cutting units are exposed forwardly or to the side for allowing an operator to service the cutting units. The knuckle joint mechanism helps the operator easily switch the vehicle between its mowing mode and its service mode. The knuckle joint secures the cutting unit in a relatively rigid position when the cutting unit is exposed for service.

U.S. Pat. Nos. 5,293,729, 5,297,378 and 5,459,984 assigned to Deere & Company, and U.S. Pat. Re. No. 34,921 assigned to The Toro Company, provide examples of grass mowing machines for golf courses having cutting unit mounting devices for reel mower cutting units.

Existing cutting unit mounting devices are relatively expensive and complex, and have a relatively high parts count, which can contribute to the cost and assembly time of the grass mowing machine. There is a need for a lower cost, simplified cutting unit mounting device that allows the cutting unit to pitch, yaw and steer during mowing, and that allows the cutting unit to be easily moved from a mowing position to a transport position, and rotated to a service position. There also is a need for a cutting unit mounting device that minimizes any damage to the turf as the raised cutting unit is lowered down to the mowing position.

Cutting unit mounting devices may include ball joints for connecting cutting units to lift arms. To manufacture the ball joint, it is necessary to slide the ball over a tubular element. Then, the tubular element may be bent or welded into a U-shaped yoke including a crossbar extending laterally over and attached to the left and right sides of the cutting unit. Before the yoke assembly can be painted, the ball must be masked to prevent paint buildup from interfering with the proper fit between the ball and its housing. After painting, the masking must be removed before assembly of the ball in the ball housing. The ball then must be located and positioned on the yoke using a pin which is inserted in and through a hole drilled through both the ball and the tube. Each of these steps are time consuming and costly. Additionally, the ball does not have a protective finish so it may readily rust in the corrosive environment where grass mowing machines operate. There is a need for an improved ball joint for a cutting unit mounting device, and an improved method for manufacturing a ball joint for a cutting unit mounting device, that will reduce cost and time, and improve quality.

SUMMARY OF THE INVENTION

A cutting unit mounting device for mounting a cutting unit to a lift arm includes a ball having notches mounted to a tubular cross member having first and second ends attached to the cutting unit. The ball is held in a ball housing having a partially spherical cavity. A lock pin extends through the ball housing and has an end engaging one of the notches to hold the cutting unit in a mowing position, and another of the notches to hold the cutting unit in a service position.

The cutting unit mounting device reduces cost and complexity, and has a low parts count, so that it can minimize cost and assembly time of the grass mowing machine. The mounting device allows the cutting unit to pitch, yaw and steer during mowing, and allows the cutting unit to be easily moved from a mowing position to a transport position, and rotated to a service position. The cutting unit mounting device also minimizes any damage to the turf as the raised cutting unit is lowered down to the mowing position with the rear of the cutting unit lower than the front of the cutting unit.

DESCRIPTION OF THE PREFERRED EMBODIMENT

Figure 1:
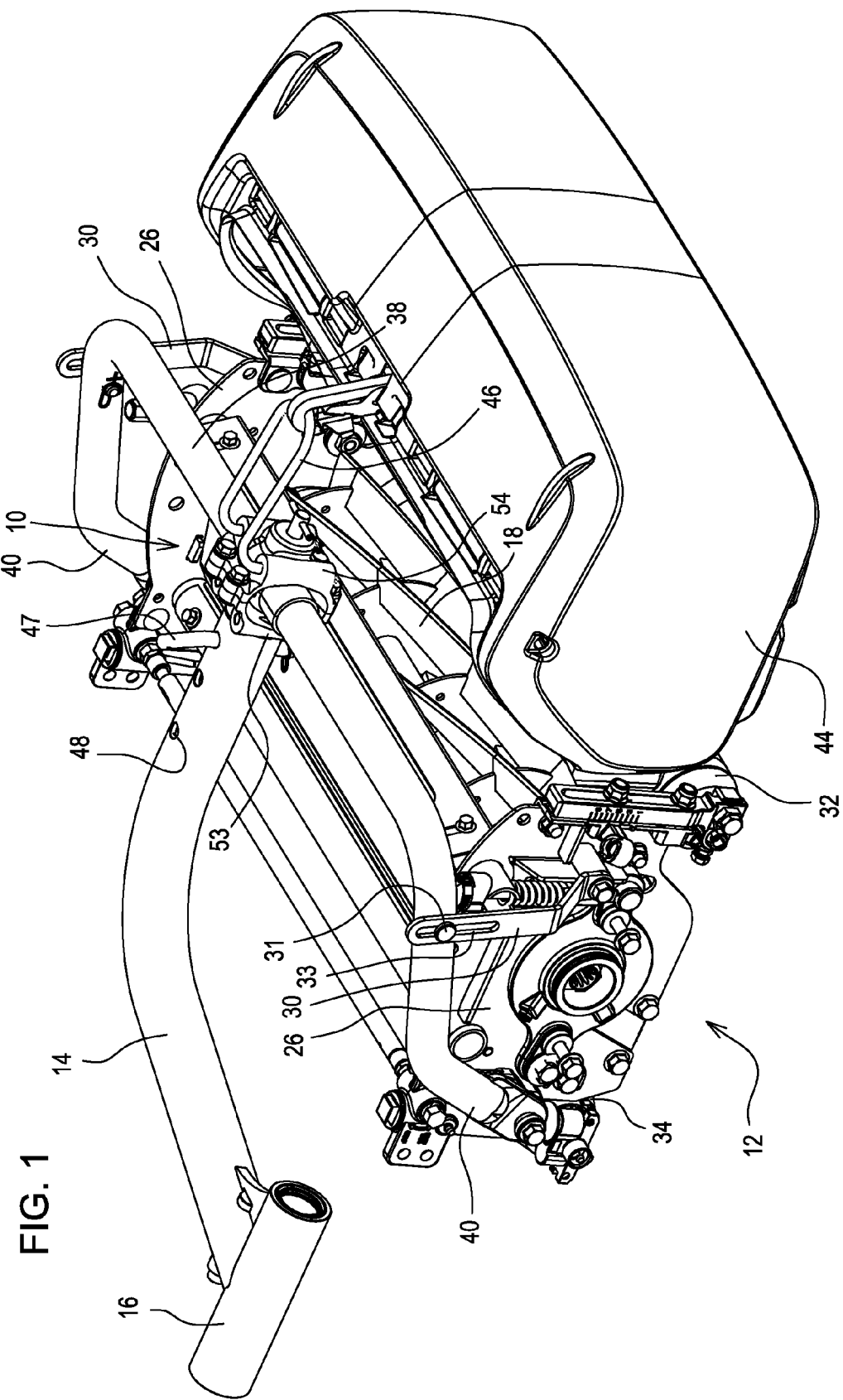
FIG. 1 is a perspective view of a cutting unit mounted to a grass mowing machine in a mowing position using a cutting unit mounting device according to a first embodiment.

As shown in FIG. 1, in a first embodiment, cutting unit mounting device 10 may be used to mount cutting unit 12 to a grass mowing machine. In the mowing position, the cutting unit mounting device allows the cutting unit to follow ground contours, pivoting on three axes as the cutting unit is pushed across the turf. A single cutting unit mounting device may be provided for a single cutting unit on a grass mowing machine, or multiple cutting unit mounting devices may be provided for multiple cutting units. Three, five or more cutting units may be mounted side-by-side in two rows carried by a grass mowing machine having a vehicle with traction drive. For example, each cutting unit mounting device 10 may be positioned at the end of a lift arm 14 extending laterally and/or forwardly from the grass mowing machine. The lift arm may pivot with respect to the grass mowing machine so that the cutting unit may be raised and lowered with a hydraulic or electric lift device. The lift arm also may provide down pressure on the cutting unit when mowing.

Still referring to FIG. 1, in one embodiment, lift arm 14 may be a hollow L-shaped tube having a first end 16 pivotably connected to a grass mowing machine frame, and a second end extending laterally and/or forwardly from the frame when it is in the mowing position. A hydraulic cylinder may be engaged to lift arm 14 to selectively pivot the lift arm to raise and lower the cutting unit. The hydraulic cylinder also may be adapted to apply a downforce to the lift arm for pressing the cutting unit against the ground during mowing. Alternatively, instead of a hydraulic cylinder, the lift arm may be raised and lowered, and down pressure may be applied, by an electric motor lift, spring, or other mechanism.

As shown in FIG. 1, in one embodiment, cutting unit 12 may include a generally cylindrical cutting reel 18 rotatably supported between left and right opposing side frames 26. The reel may have spiral blades rotating on a reel shaft with a horizontal axis. The reel may have a width between about 18 inches and about 30 inches, and a diameter between about 4 inches and about 10 inches. The reel may be driven by an electric or hydraulic motor mounted on the end of the reel, or by a belt or chain drive engaged to a motor. The cutting unit may include ground engaging front and rear support rollers 32, 34 which may help support the cutting unit at a proper height above the ground during mowing operations.

As shown in FIG. 1, in one embodiment, cutting unit mounting device 10 may be attached to yoke 38, which may be a generally U-shaped tubular bar member having opposing ends 40 pivotably connected to the left and right side frames 26 of cutting unit 12, and a crossbar between the ends and extending laterally over the cutting unit. The cutting unit mounting device may be mounted on and around yoke 38 at or near the yoke's midpoint. Additionally, grass catcher 44 may hang from support 46 which extends forwardly from the cutting unit mounting device or yoke.

Figure 2:
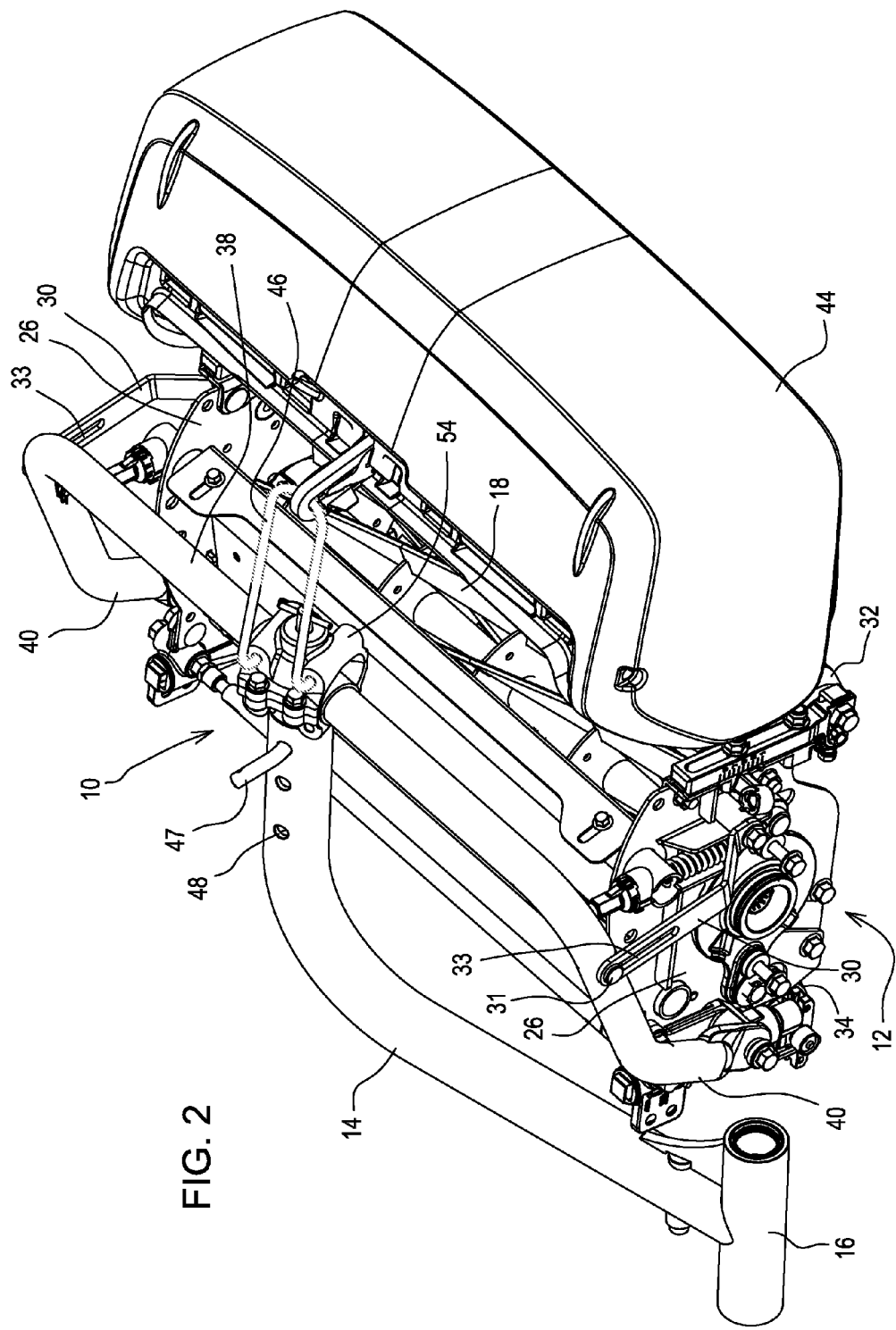
FIG. 2 is a perspective view of a cutting unit mounted to a grass mowing machine in a transport position using a cutting unit mounting device according to a first embodiment.

As shown in FIG. 2, lift arm 14 may pivot on axis 16 to raise the cutting unit to the transport position. The lift arm may raise the cutting unit a sufficient distance off the turf as needed for the transport requirements. The lift arm also may raise the cutting unit off the ground only slightly, by pivoting about 20 degrees, for example, to momentarily raise the cutting unit to a cross cut position, instead of to the height shown in FIG. 2.

Figure 3:
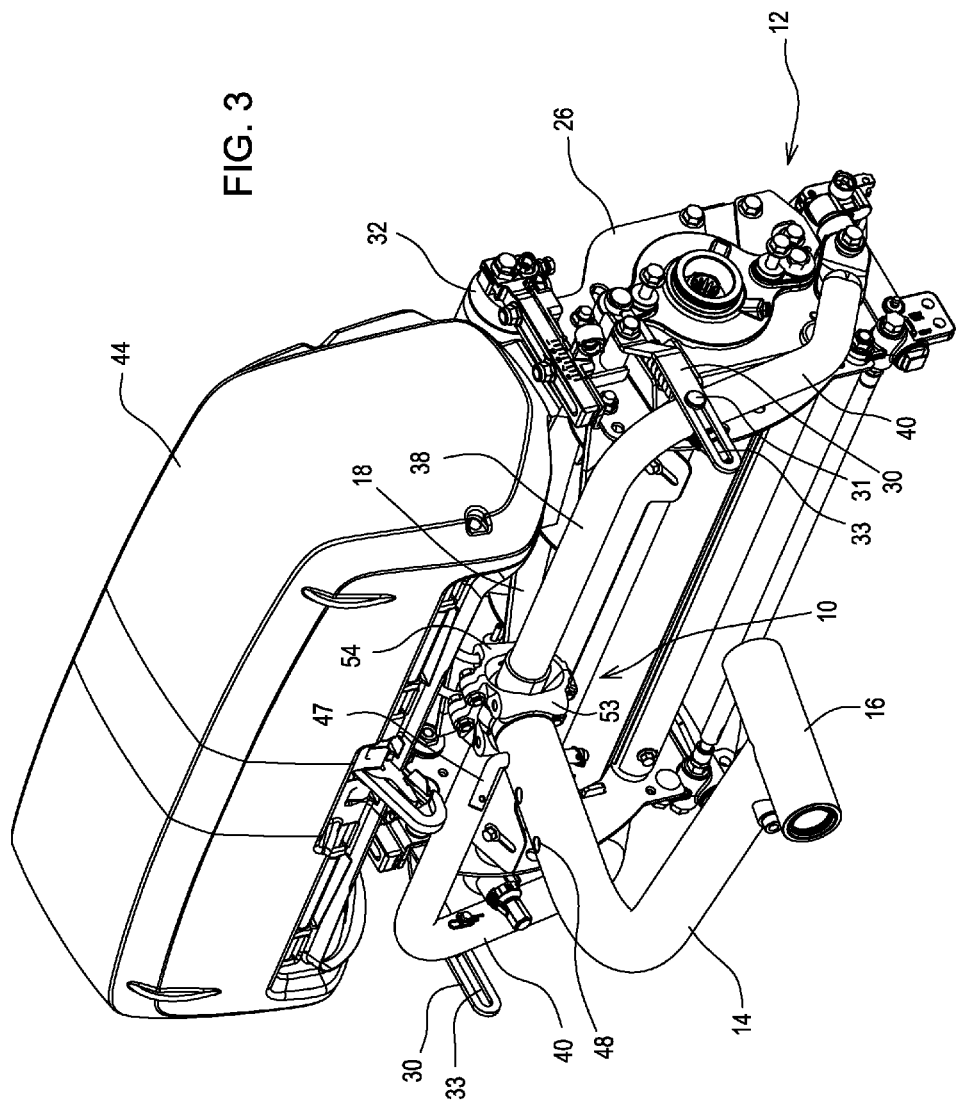
FIG. 3 is a perspective view of a cutting unit mounted to a grass mowing machine in a service position using a cutting unit mounting device according to a first embodiment.
Figure 4:
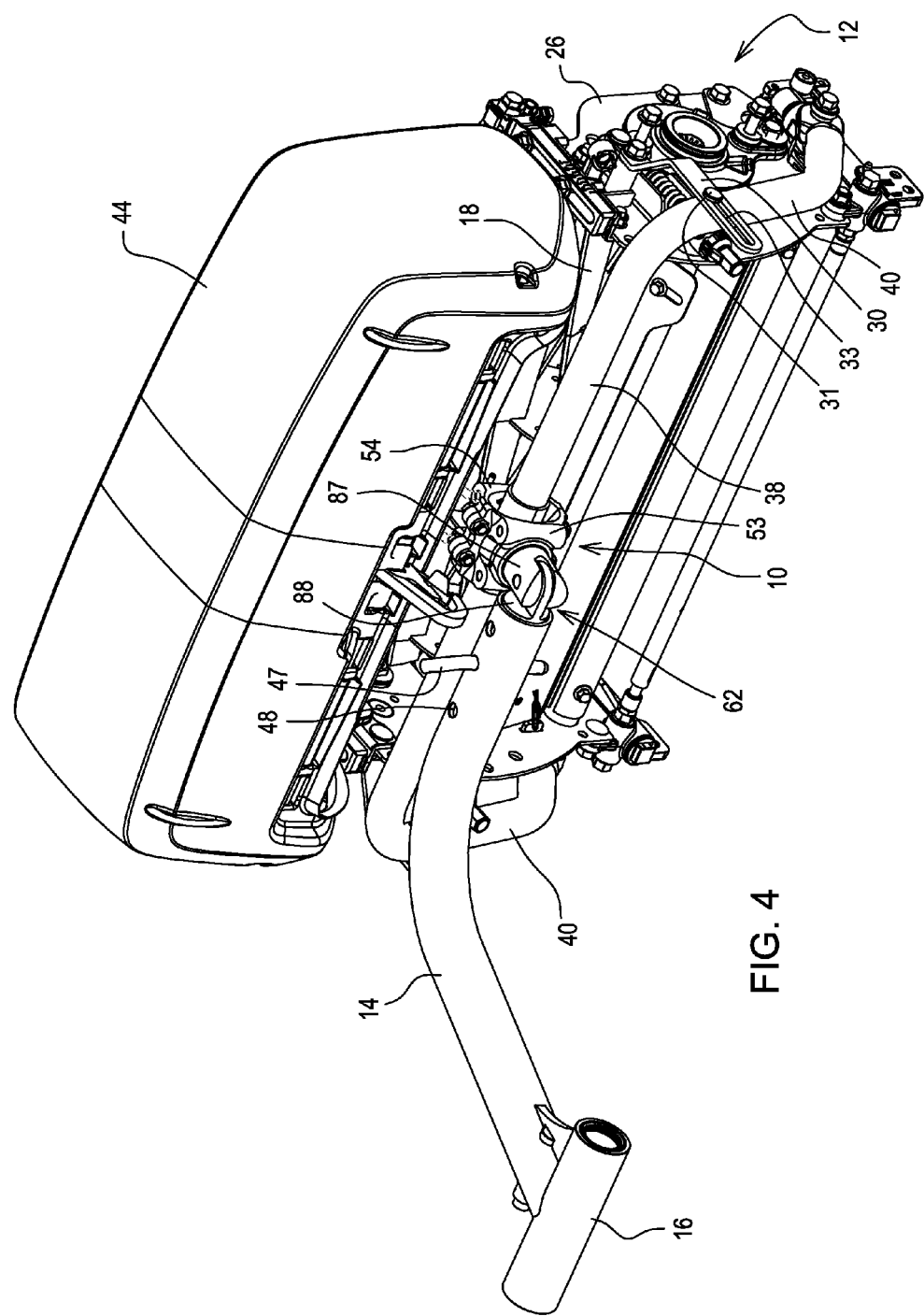
FIG. 4 is a perspective view of a cutting unit mounted to a grass mowing machine in a service position using a cutting unit mounting device according to a second embodiment.

As shown in the embodiments of FIGS. 3 and 4, lift arm 14 also may pivot on axis 16 to raise the cutting unit to a service position. In the service position, the back end of the cutting unit faces downwardly so that the cutting unit may rest on the ground surface. While in the service position, the underside of the cutting unit may face forwardly as shown in FIG. 3, or face outwardly as shown in FIG. 4. For example, the three front cutting units of a fairway mower may face forwardly in the service position, and the two rear cutting units may face laterally outwardly in the service position.

Figure 5:
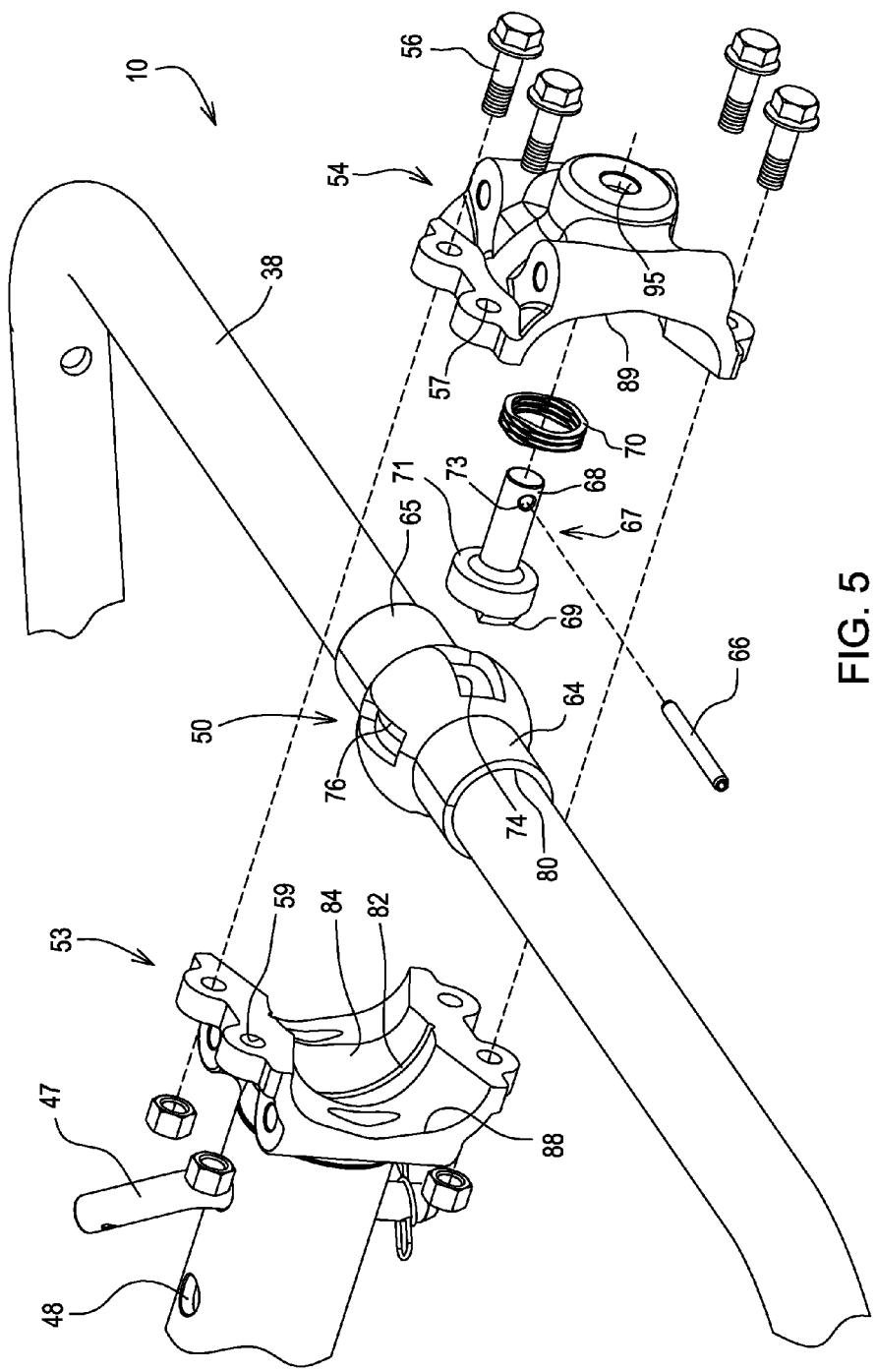
FIG. 5 is an exploded perspective view of a cutting unit mounting device for a grass mowing machine according to a first embodiment.

As shown in FIG. 5, cutting unit mounting device 10 may include ball 50 which may be a generally spherical body mounted to yoke 38. Optionally, a pair of cylindrical or sleeve shaped extensions 64, 65 may extend outwardly from opposing sides of the ball on the yoke. A cylindrical internal bore 80 may extend through the spherical body and extensions. The cylindrical internal bore may be dimensioned to fit around the outer diameter of yoke tube 38.

Figure 6:
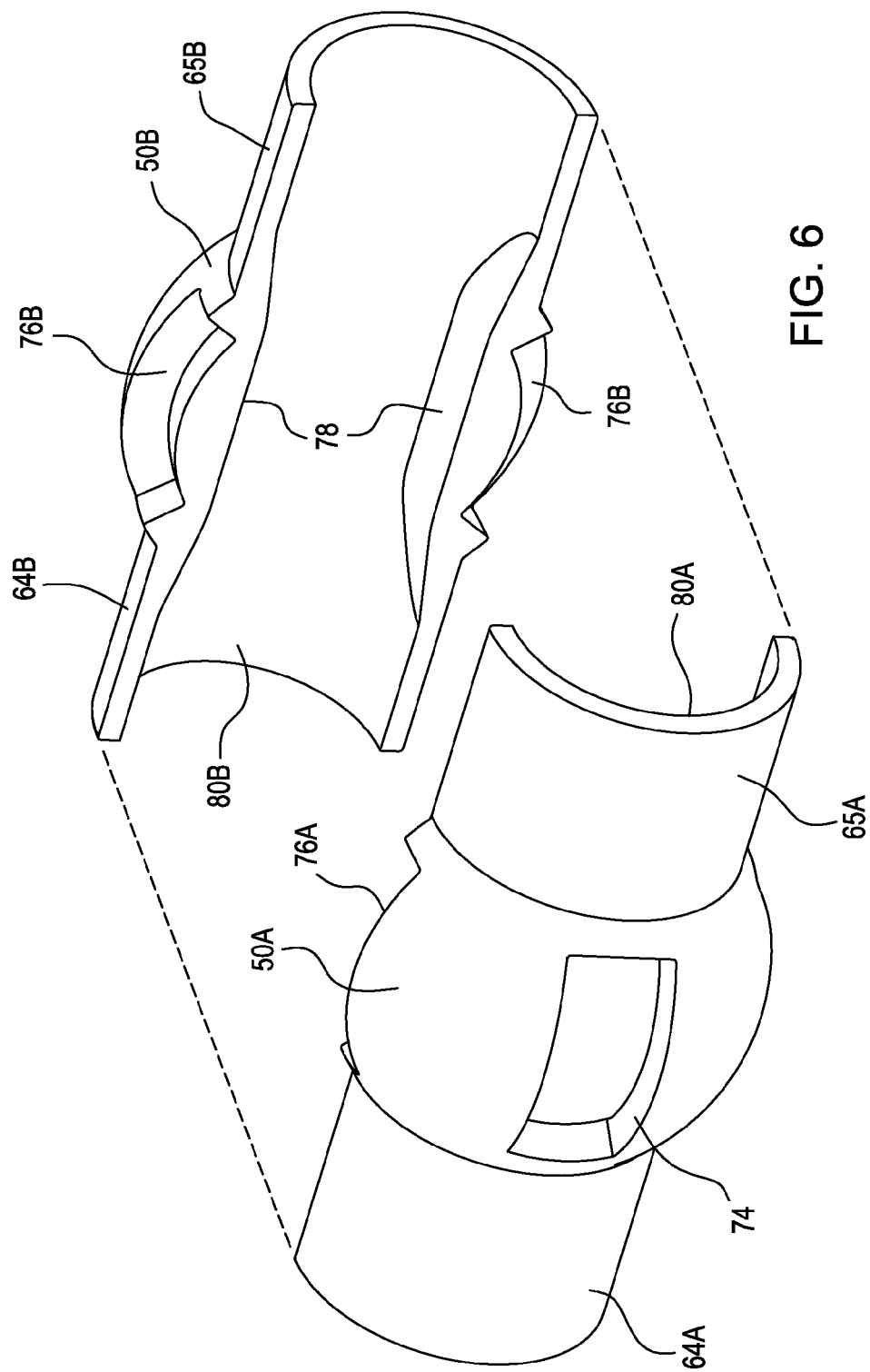
FIG. 6 is a perspective view of a pair of ball halves for the ball joint of the cutting unit mounting device according to a first embodiment.

In one embodiment, as shown in FIG. 6, ball 50 may be a two piece split member. Each of the two ball halves 50A, 50B are semispherical and may be substantially identical in size and shape. Ball half 50A may have extensions 64A, 65A from the sides of the semispherical body, and ball half 50B may have corresponding extensions 64B, 65B on the sides of the semispherical body. Internal surfaces 80A, 80B through the semispherical ball halves and extensions are dimensioned to fit around the yoke tube. The ball halves may be manufactured by powdered metal forming, and each may be coated with a rust resistant finish. Yoke 38 may be painted before the ball halves are attached thereto, and without requiring any masking of the ball halves. Then the split ball halves may be attached to the yoke. One or more flat or non-cylindrical surfaces 78 may be integrally formed on each ball half and may extend radially inwardly from the ball's cylindrical internal bore, and may engage corresponding surfaces on each side of yoke tube 38. These engaging surfaces may help position the ball halves on the yoke, and lock the halves in place by preventing relative rotation of the ball and the yoke tube. The ball halves may be held together in assembly by the two piece ball housing which is bolted together.

Figure 7:
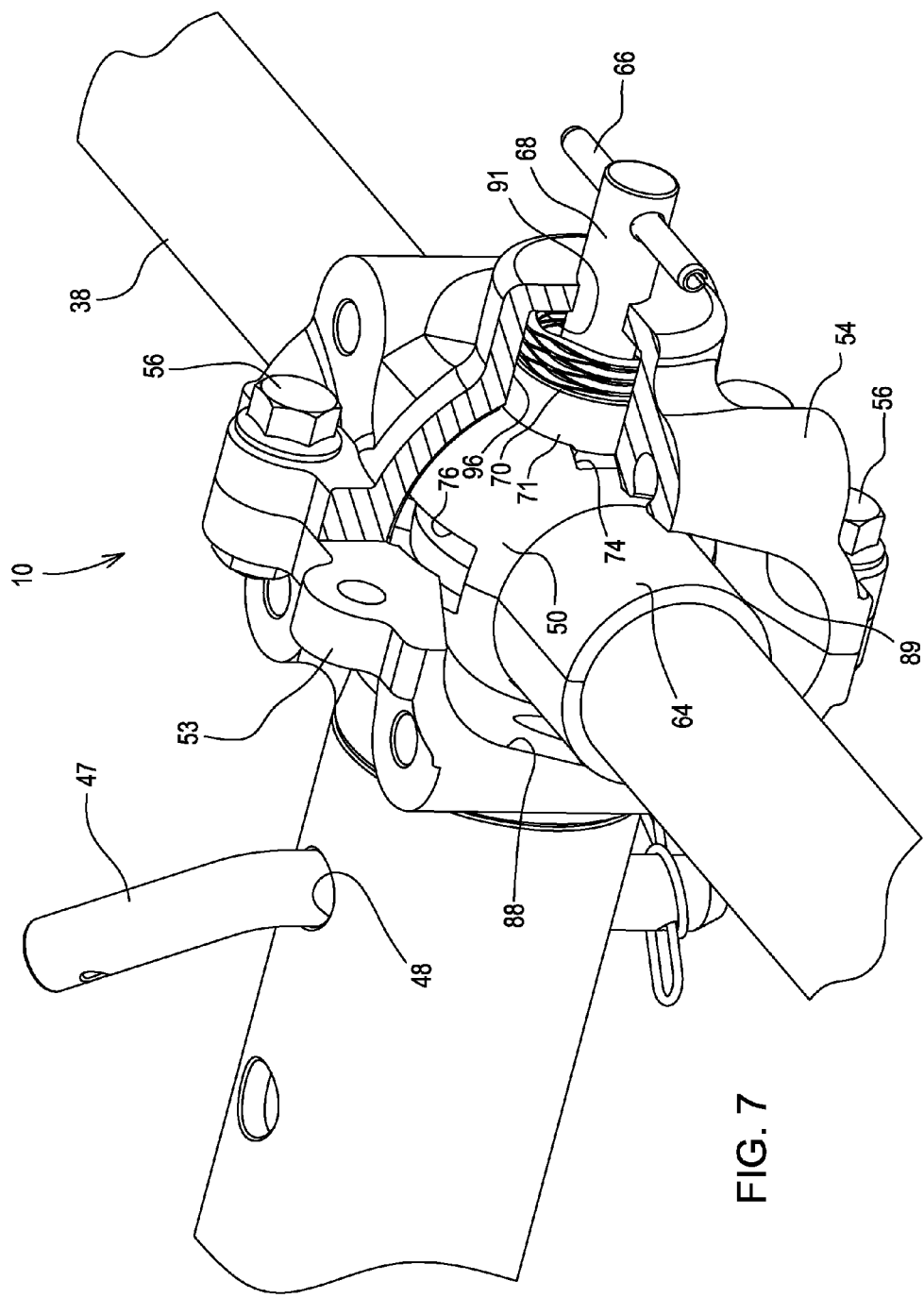
FIG. 7 is a perspective view, partially in section, of a cutting unit mounting device for a grass mowing machine according to a first embodiment.

In one embodiment, as shown in FIGS. 5 and 7, the cutting unit mounting device may include a two-piece ball housing consisting of ball retainer 53 and ball retainer cap 54. The ball retainer and ball retainer cap may have internal cavities 84, 86 respectively that are partially spherical in shape. When the ball retainer and ball retainer cap are fastened together such as by threaded fasteners 56 through holes 57, 59, the ball retainer and ball retainer cap may form a cavity which is dimensioned to hold ball 50 and allow the ball to pivot therein. Grease grooves 82, 83 also may be provided in the respective cavities of the ball retainer and ball retainer cap.

In one embodiment, as shown in FIGS. 5 and 7, the cutting unit mounting device may be configured so that the cutting unit may steer and yaw. This may be accomplished with lateral, outwardly flared openings 88, 89 in each side of the ball retainer and ball retainer cap. These lateral openings may provide stops that limit the angular movement of the yoke tube. The lateral openings may flare outwardly from the left and right sides of spherical cavities 84, 86. For example, the lateral openings may allow the yoke tube to yaw (or pivot vertically) approximately plus or minus 21 degrees from a level or horizontal alignment, and steer (or pivot horizontally) approximately plus or minus 5 degrees from an alignment perpendicular to travel. The lateral openings may be sloped to urge the yoke tube toward the central positions on both axes.

Still referring to FIGS. 5 and 7, in one embodiment, the cutting unit mounting device may include notches 74, 76 in the outer spherical body 62 of ball 50. Notch 74 may be ninety degrees from notch 76. The cutting unit mounting device also may include lock pin 67 that engages one of the notches to hold the cutting unit in a mowing or transport position, and another of the notches to hold the cutting unit in a service position. For example, the end of lock pin 67 may include a head 71 with a tooth or projection 69 that may engage notch 74 when the cutting unit is in the mowing or transport positions, or between those positions. The end of the lock pin may engage notch 76 when the cutting unit is in the service position. As shown in FIG. 6, split ball 50A, 50B may have split notch 76A, 76B.

In one embodiment shown in FIGS. 5-7, each notch 74, 76 may be generally rectangular in shape and may be centered ninety degrees from each of the other notches on the spherical ball's outer surface. Each notch may be dimensioned to capture the projection 69 on head 71 at the end of lock pin 67. Projection 69 may be generally rectangular in shape with a concave outer face that may enter into and be captured in one of the notches. Once the projection is captured in a notch, the lock pin holds and locks the cutting unit in that position. The head of the lock pin may be attached to shaft 68. Lock pin spring 70 may be positioned around the shaft, between head 71 and end wall 91 of recess 96 in ball retainer cap 54. The lock pin spring may urge lock pin 67 toward the ball so that the end of the lock pin engages one of the notches. Shaft 68 of the lock pin may extend through hole 95 in end wall 91 of ball retainer cap, where it may be connected to handle 66. The operator may pull the handle to compress the spring and disengage the end of the lock pin from one of the notches, and then release the handle to reengage it with a notch. The handle alternatively may be a lever that may be used to move and/or hold the lock pin into or out from engagement with a notch in the ball.

In one embodiment of the cutting unit mounting device shown in FIGS. 5-7, the length and width dimensions of notch 76 may be substantially the same as the dimensions of the tooth or projection on the end of the lock pin. However, the length and width dimensions of notch 74 may be greater than those of the tooth or projection on the end of the lock pin. While notch 76 holds the lock pin end rigidly in place in the service position, notch 74 may be configured to let the cutting unit steer and yaw while mowing. The steer and yaw angles may be limited by the outwardly flared lateral openings on the ball retainer and ball retainer cap which function as stops. For example, the notch dimensions may allow the cutting unit to steer left or right 5 degrees from center, and yaw plus or minus 21 degrees from horizontal.

Now referring back to FIG. 2, the cutting unit mounting device is shown with the cutting unit raised to the transport position. In this embodiment, the cutting unit mounting device may assure that the rear of the cutting unit hangs lower than the front of the cutting unit as the cutting unit is raised and lowered. To raise the cutting unit from the mowing position to the transport position, the operator may actuate a lift mechanism to raise lift arm 14. The lift arm starts pivoting up to raise the center of yoke 38 while the left and right ends of the yoke pivot on the sides of the cutting unit. As the lift arm starts raising the yoke, follower 31 slides up within lost motion slot 33 in strap 30, which is attached between the cutting unit and the yoke. Also, raising the lift arm causes the end of lock pin 67 to move up toward the top edge of notch 74 in ball 50. When follower 31 reaches the top end of slot 33, and end of lock pin 67 reaches the top edge of notch 74, the front of the cutting unit is lifted off the ground before the rear of the cutting unit. Subsequently, the rear of the cutting unit then may be lifted off the ground. Thus, lost motion slot 33 and notch 74 are dimensioned to allow the rear of the cutting unit to hang lower than the front while the cutting unit is lifted or held in a raised position.

Still referring to FIG. 2, in one embodiment, to lower the cutting unit, the operator may actuate the lift mechanism to lower lift arm 14. Lost motion slot 33 and notch 74 are dimensioned to allow the rear of the cutting unit to hang lower than the front while the cutting unit is lowered. As a result, rear roller 34 may contact the ground first as the cutting unit is lowered from the transport position to the mowing position, thereby reducing possible damage to the turf. Once the rear of the cutting unit reaches the ground, follower 31 may move down from the top end of slot 33 until it reaches a midpoint of the slot. Also, the end of lock pin 67 may move or pivot away from the top edge of notch 74 in ball 50. The front of the cutting unit then reaches the ground.

Figure 8:
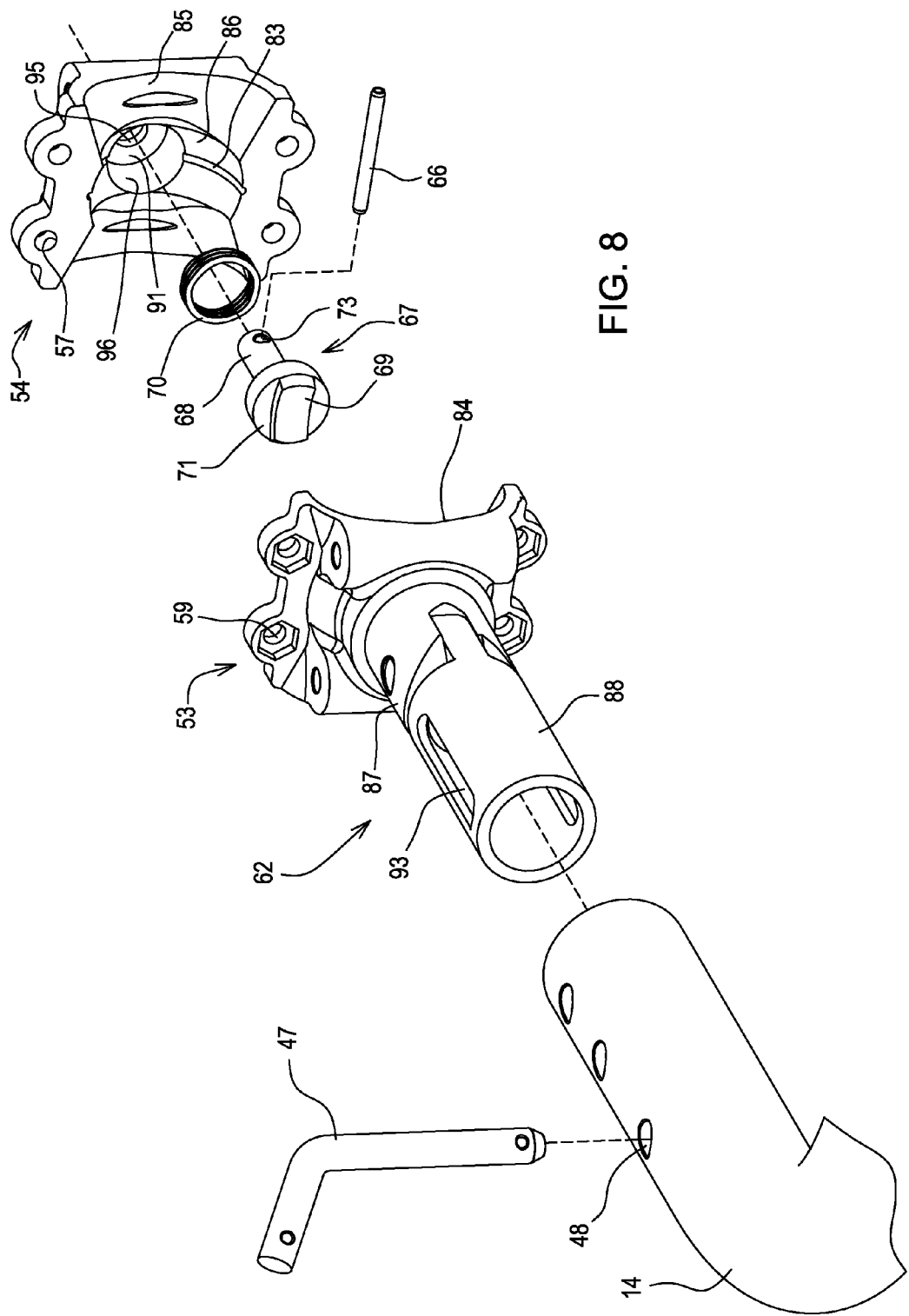
FIG. 8 is a perspective view of a ball retainer and ball retainer cap of the cutting unit mounting device according to a second embodiment.

In one embodiment, pin 47 may be inserted through one of holes 48 in lift arm 14 to hold ball retainer 53 to the lift arm, in the mowing, transport or service positions. Pin 47 also may engage or be inserted through a corresponding hole in a sleeve attached to the ball retainer and that slides into the end of the lift arm. In a second embodiment shown in FIGS. 4 and 8, pivotable sleeve 62 may be attached to ball retainer 52. The pivotable sleeve may include first sleeve member 87 attached to the ball retainer, and second sleeve member 88 pivotably attached thereto. The second sleeve member may have a slot 93 that pin 47 may be inserted through. To hold the cutting unit in the mowing or transport positions, the pivotable sleeve, including both of the first and second sleeve members, may be fully inserted into the end of the lift arm. Once the pivotable sleeve is fully inserted into the lift arm, pin 47 may hold it in place by inserting the pin through hole 48 in the lift arm and slot 93 in the pivotable sleeve. To hold the cutting unit in the service position, the pivotable sleeve may be only partially inserted into the end of the lift arm so that the first sleeve member is completely outside the lift arm and can pivot with respect to the second sleeve member as shown in FIG. 8. This allows the cutting unit to pivot so that the underside of the cutting unit may face outwardly for service. Pin 47 may hold it in place by inserting the pin through another hole 48 near the end of the lift arm and slot 93 in the pivotable sleeve.

In one embodiment, to move a cutting unit from the mowing position to the service position, the operator may pull the rotate for service handle 66 to pull the end of lock pin 67 out of engagement from notch 74. The operator then may raise lift arm 14 by actuating a hydraulic or electric lift arm cylinder. As the lift arm pivots up toward the service position, the weight of the cutting unit causes the cutting unit to rotate forward, and ball 50 pivots with respect to the ball housing, until the cutting unit is vertical as shown in FIG. 3. The operator then may release the rotate for service handle to insert the end of lock pin 67 into notch 76 for locking the cutting unit in the service position, so that the underside of the cutting unit faces forwardly as shown in FIG. 3. Instead, for the underside to face outwardly to the side as shown in FIG. 4, the operator also may slide pivotable sleeve 62 further out from the lift arm and reinsert pin 47 in another hole 48 closer to the end of the lift arm. For either of the service positions, the operator then may lower the lift arm sufficiently so that the end of the cutting unit rests on the ground surface.

In one embodiment, to move the cutting unit from the service position back to the mowing position, the operator may raise lift arm 14 to move the cutting unit off the ground. The operator then may pull the rotate for service handle to pull the end of lock pin 67 out of engagement from notch 76. The operator then may lower lift arm 14 by actuating a hydraulic or electric lift arm cylinder. Before the cutting unit reaches the mowing position, the operator may use the rotate for service handle to reinsert the end of lock pin 67 in notch 74. The rear of the cutting unit hangs down lower than the front of the cutting unit, due to the slot in strap 30 and the dimensions of notch 74 rear of the cutting unit.

Having described the preferred embodiment, it will become apparent that various modifications can be made without departing from the scope of the invention as defined in the accompanying claims.

The invention claimed is:

1. A cutting unit mounting device comprising:
   a tubular cross member having first and second ends;
   a ball having a first notch and a second notch mounted to the tubular cross member; the first notch having length and width dimensions greater than the second notch;
   a ball housing having a partially spherical cavity holding the ball; and
   a lock pin extending through the ball housing and having an end, when in a first position said lock pin engages the first notch having greater length and width dimensions than the end of the lock pin enabling side to side and up and down movement of the end of the lock pin within the first notch, and when in a second position said lock pin engages the second notch having length and width dimensions complementary to the end of the lock pin.

2. The cutting unit mounting device of claim 1 further comprising a spring biasing the end of the lock pin into the notches.

3. The cutting unit mounting device of claim 1 further comprising a handle attached to the lock pin.

4. The cutting unit mounting device of claim 1 wherein the ball housing comprises a ball retainer and a ball retainer cap secured to the ball retainer by a plurality of threaded fasteners.

5. The cutting unit mounting device of claim 1 further comprising lateral openings on each side of the partially spherical cavity that provide stops limiting angular movement of the tubular cross member.

6. A cutting unit mounting device comprising:
   a ball through which a yoke extends laterally; the ball having an outer spherical body and being pivotably mounted in a ball housing having an internal cavity that is partially spherical in shape and is attached to a lift arm;
   a releasable lock pin that is biased to engage, in a first position, a first notch having greater length and width dimensions than the end of the lock pin enabling side to side and up and down movement of the end of the lock pin within the first notch, and in a second position, a second notch having smaller length and width dimensions than the first notch and length and width dimensions complementary to the end of the lock pin;
   the ball housing having stops to limit the pivoting of the ball and yoke with respect to the ball housing.

7. The cutting unit mounting device of claim 6 further comprising a plurality of notches in the ball to engage the ball in a plurality of positions with respect to the ball housing.

8. The cutting unit mounting device of claim 6 wherein the ball housing includes a ball retainer releasably engaged to the lift arm with a pin.

9. The cutting unit mounting device of claim 8 further comprising a pivotable sleeve attached to the ball retainer.

10. A cutting unit mounting device comprising:
    a ball pivotably mounted inside a ball housing attached to a lift arm;
    a lock pin inserted through the ball housing and engaging, in a first position, a first notch having greater length and width dimensions than the end of the lock pin to allow limited pivoting of the ball up and down and side to side with respect to the ball housing, and in a second position, a second smaller notch in the ball that is ninety degrees apart from the first notch having smaller length and width dimensions than the first notch and length and width dimensions complementary to the end of the lock pin thereby restricting the ball from pivoting with respect to the ball housing.

11. The cutting unit mounting device of claim 10 wherein the ball housing is pivotably mounted to a first the end of the lift arm.

12. The cutting unit mounting device of claim 10 further comprising laterally spaced openings on each side of the ball housing to limit pivoting of the ball with respect to the ball housing in the mowing position.

\* \* \* \* \*